United States Patent [19]

Belshaw et al.

[11] Patent Number: 4,699,796
[45] Date of Patent: Oct. 13, 1987

[54] PROCESS FOR MOVING FOOD OBJECTS THROUGH A FRYING TANK

[75] Inventors: Thomas E. Belshaw, Seattle; Frederick G. Woodworth, Kent; Wilbur D. Wilke, Camano Island, all of Wash.

[73] Assignee: Belshaw Bros., Inc., Seattle, Wash.

[21] Appl. No.: 892,763

[22] Filed: Aug. 1, 1986

Related U.S. Application Data

[62] Division of Ser. No. 770,849, Aug. 29, 1985, Pat. No. 4,628,804.

[51] Int. Cl.⁴ .............................................. A23L 1/01
[52] U.S. Cl. .................................... 426/438; 426/439
[58] Field of Search ................. 426/438, 439; 99/404, 99/407, 409

[56] References Cited

U.S. PATENT DOCUMENTS

| | | | |
|---|---|---|---|
| 3,326,116 | 6/1967 | Belshaw | 99/407 |
| 3,329,081 | 7/1967 | Roth | 99/405 |
| 3,633,490 | 1/1972 | Schiffmann | 99/407 |
| 3,733,202 | 5/1973 | Marmor | 426/438 |
| 4,176,590 | 12/1979 | Kochan | 99/409 |
| 4,346,649 | 8/1982 | Wilke | 99/404 |

Primary Examiner—George Yeung
Attorney, Agent, or Firm—Seed and Berry

[57] ABSTRACT

A small, inexpensive doughnut fryer has a conveyor and separate elevator that are driven from the same shaft without interference with one another. Sprockets for driving the elevator are recessed to receive rods from the conveyor. The entire conveyor assembly is provided with a quick release coupling to the power supply. A method and apparatus for moving objects to be fried through a hot frying liquid by producing intermittent waves and eddies in the liquid in the desired direction of travel to propel the objects in a straight line.

2 Claims, 4 Drawing Figures

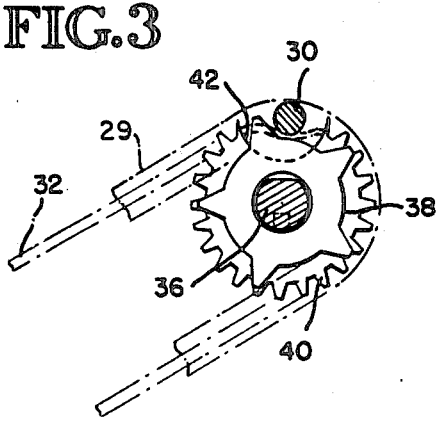
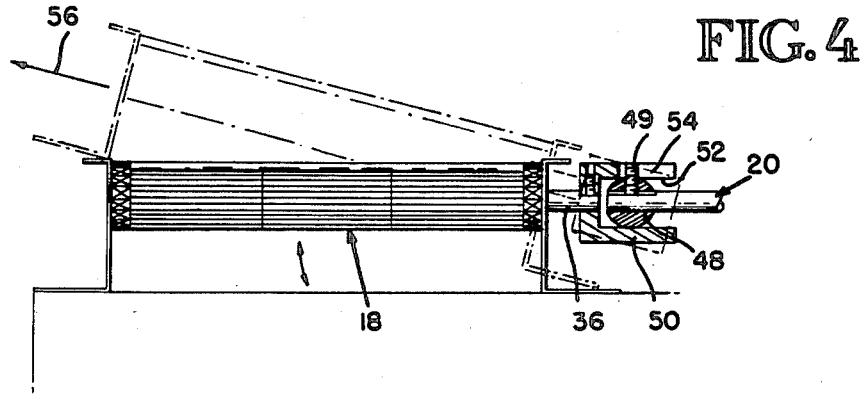

PROCESS FOR MOVING FOOD OBJECTS THROUGH A FRYING TANK

This application is a divisional application of application Ser. No. 770,849, filed Aug. 29, 1985 now U.S. Pat. No. 4,628,804.

DESCRIPTION

1. Technical Field

This invention pertains to doughnut frying machines and, more particularly to improvements in conveyors and drive mechanisms for such frying machines. In addition, the invention pertains to methods and apparatus for moving objects to be fried through a hot liquid in a frying tank.

2. Background Art

Frying machines, particularly those for frying small doughnuts or other food objects, must be easy for the operator to use and to clean at the end of a frying operation. In addition, these machines tend to be sold in high volumes, at low cost and must have a minimum number of components to be marketable. A machine is disclosed in U.S. Pat. No. 4,346,649 which accomplishes some of these objectives. This invention is an improvement of the machine in U.S. Pat. No. 4,346,649.

A difficulty in moving objects to be fried through the hot frying liquid of a frying tank is that the heating element at the bottom of the tank creates eddy currents in the liquid which causes the objects being moved through the liquid to circulate in irregular paths. This moves the objects out of a straight alignment transverse to the desired path of movement through the frying tank. The objects then tend to bunch up and become jammed within the conveyor. When the objects are brought to a flipper to invert the objects for frying the uncooked side of the object, the flipping is not successfully accomplished if the objects are not perfectly aligned in a transverse row when they reach the flipper.

DISCLOSURE OF INVENTION

It is one of the objects of this invention, therefore, to move the objects through the liquid in a straight transverse row. It was discovered that by imparting intermittent wave motions to the liquid, that the wave motion would propel the objects forward in a row and overcome the cross motions caused by heat eddy currents. It was also discovered that by using a bar conveyor that created a wave at the leading edge of the pushing bar, that simultaneously an eddy pulling current or a void-type pulling action was produced at the trailing edge of the next forward bar. This combination then of a rearward pushing wave and a forward pulling current, if done intermittently through the length of the frying tank, keeps the floating objects aligned consistently in a transverse row so they are in optimum alignment when they reach the flipper and do not tend to become out of alignment at any area in the tank.

The improvements to the conveying apparatus are basically to drive a bar conveyor for pushing the doughnuts through the frying tank from the same shaft that a belt type elevator conveyor is driven. This reduces the drive mechanisms necessary for the conveyor and the elevator. The sprockets for the bar conveyor and the elevator that are coupled to the common shaft are uniquely modified so that the conveyor sprockets can be of different pitch circles giving the elevator a slightly faster speed than the bar conveyor, but which enable the bars of the bar conveyor to move around the common shaft without interfering with the sprockets for the belt elevator. Thus it is a unique feature of this invention to provide a bar conveyor that overlies an endless belt elevator, both of which are driven from a common shaft, but at different speeds and with the bars being able to pass around the shaft and the sprockets for the belt elevator without interference.

Another unique improvement of the conveyor and tank system is a coupling which enables the entire conveying system to be lifted as an integral unit out of the frying tank while simultaneously decoupling the driving shaft from the power supply from the driven shaft of the conveyor and elevator with one simple sliding movement. This greatly simplifies the construction of the machine and greatly simplifies and makes safer the disassembly of the machine for cleaning at the end of each operation.

BRIEF DESCRIPTION OF THE DRAWINGS

FIG. 3 is a fragmentary cross-section through the driven shaft of the conveyor system.

FIG. 4 is a schematic illustrating the simplified mechanism for disconnecting the driven shaft and the integral conveyor and elevator assembly from the driving shaft of the power supply.

BEST MODE FOR CARRYING OUT THE INVENTION

Figure 1:
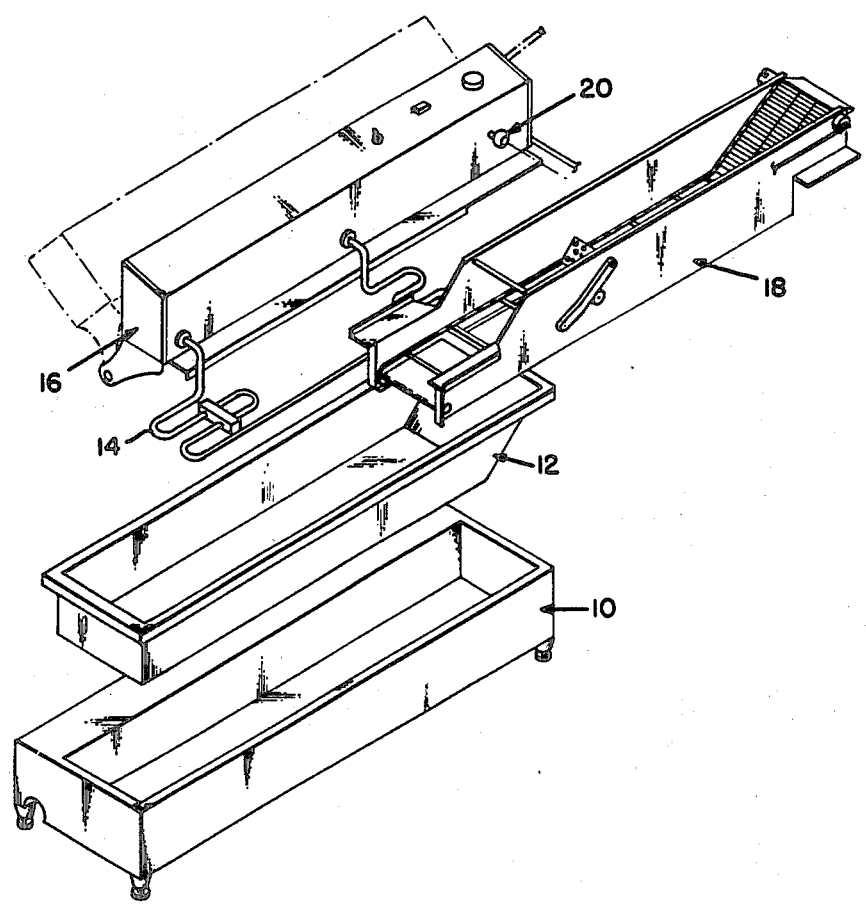
FIG. 1 is an exploded, isometric view of a frying machine embodying the principles of the invention.

The fryer comprises a base 10 in which is fitted a removable frying tank 12. Liquid is kept hot in the frying tank by a heating element 14 coupled to a control console 16. A conveyor assembly 18 is also removably fitted into the tank 12 and is drivingly coupled to the driving shaft 20 of a power supply within the console 16.

The details of operation and construction of the basic components of the frying machine are shown in U.S. Pat. No. 4,346,649, the description of which is incorporated herein by reference thereto. Doughnuts or other objects to be fried are dropped from a hopper or cutter (not shown) into the inlet or left end of the frying tank (as viewed in FIG. 1). The cutter deposits the doughnuts at one or more laterally spaced locations in the tank generally in a transverse row. The doughnuts are moved through the tank, inverted, and then removed for cooling.

The conveyor assembly 18 includes a pair of side frames 24 (FIG. 2) coupled together by spacer bars 26. Mounted within the side frames is an elongated bar conveyor 28 having two endless chains 29 with a plurality of pusher bars 30, spaced equidistantly along the runs of the endless chains.

An elevator link belt 32 is also mounted in the side frames and runs parallel to an upwardly inclined section of the conveyor 28. The bars 30 thus move up in parallelism and slightly above the elevator belt.

It is a unique feature of this invention that both the conveyor 28 and the elevator belt 30 are driven by sprockets mounted on a common shaft 36. This shaft is provided with a set of belt sprockets 40 (FIG. 3) and a set of conveyor sprockets 38. The belt sprockets are slightly larger in circular pitch so as to move the belt 32 at a slightly increased velocity over the velocity of the conveyor.

As best shown in FIG. 3, the sprockets 40 are each cut away with a recess 42. The recesses 42 are all coaligned. The bars 30, as they reach the top of the elevator belt and come into engagement with the sprockets 38, move into the recesses 42 so that they do not actually engage any surface of the sprockets 40. This enables the bar to move rotationally relative to the sprockets 40, but not interfere with the motion of the sprockets. Thus the common simplified, inexpensive drive is suitable for operating two separate conveyors at two separate speeds without interference with one another.

Figure 2:
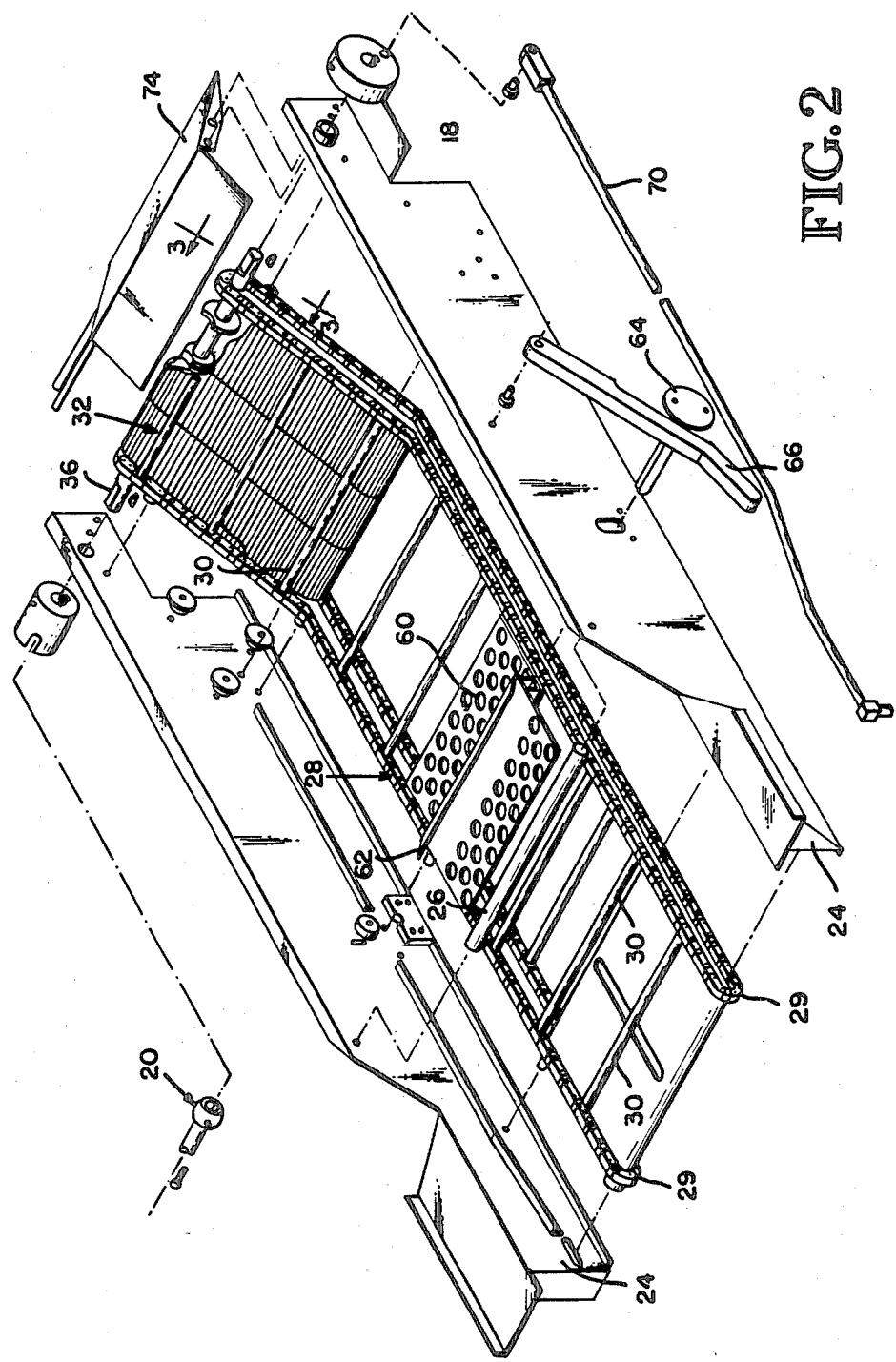
FIG. 2 is an enlarged, isometric view of a portion of the frying machine capable of carrying out the process of the invention.

Another unique feature of the invention is the way the entire conveyor assembly can be removed and decoupled from the driving shaft 20. As best shown in FIGS. 2 and 4, the driving shaft is provided with a ball 48 and a radial protruding pin 49. The driven shaft 36 is provided with a socket 50 having an opening 52 and an elongated, longitudinal slot 54. When the conveyor socket and the driving shaft ball are in the position as shown in FIG. 4, the entire conveyor assembly can be lifted as one integral unit and slid out from driving engagement with the driving shaft. The ball enables the socket to rotate clockwise as shown in FIG. 4, and the pin is free to slide within the slot until the conveyor assembly can then be moved to the left, as shown by the arrow 56 and the drive is disengaged. To reengage the drive the opposite motion is employed. This greatly simplifies the drive disconnection for ease of cleaning and reassembling.

A flipper mechanism 60 is employed essentially as in U.S. Pat. No. 4,346,649. The flipper includes a channel 62 which is engaged by the bars 30. The bar 30 as it then moves past the flipper rotates the flipper to invert a doughnut in the frying liquid. A cam 64 is provided with a flattened surface against which rests a weighted arm 66. The arm rests on the flat surface of the cam to position the flipper in perfect alignment, as shown in FIG. 2. After a doughnut has been inverted and the flipper falls back, the weighted arm guides the cam to restore the alignment position of the flipper.

A unique feature of the invention is the technique by which doughnuts are moved through the hot liquid without bunching up or becoming misaligned out of a transverse row as they approach the flipper. The heating element 14 creates fluid currents within the frying liquid. These currents tend to be circular and will impart a motion to the objects floating in the frying liquid tending to move then out of their initial transverse alignment. In this invention the drive to the driving shaft 20 is accomplished by a conventional electric AC motor which is operated through a timing switch such that the motor is operated only after a certain interval and in a repetitive manner. Thus the drive moves at a constant speed but intermittently. The intermittent motion is timed to correspond to the dropping of doughnuts or other objects to be fried into the gap between two bars, the objects being dropped in a transverse row. As the first intermittent pulse of movement occurs, the next rearwardmost bar creates a forwardly moving wave in the hot liquid. This wave impels the doughnuts forwardly toward the next most forward bar. The force is strong enough to overcome any crosscurrents created by the hot eddy currents in the liquid.

It is also found that the forward motion of the next forwardmost bar creates a small eddy pulling current or forwardly directed void which pulls the forwardly moving doughnuts toward the next forwardmost bar. This action results in the doughnuts being advanced from rearward bar to forward bar with each impulse with the doughnuts seldom moving very far rearwardly, but rather tending to follow the forward movement of the next forward bar. It has been found that this motion, particularly for smaller objects where there are several aligned in a row, uniquely keeps the objects in the transverse row while they are moved completly through the conveyor, including the alignment as they are brought into engagement with the flipper.

In overall operation, the hopper is swung back and forth across the tank and is coupled to a link 70 that is moved in synchronysm with the rotation of the driven shaft 36. The hopper thus deposits the doughnut dough into the gap between two bars. Upon the next intermittent pulse of movement, the conveyor bars push the doughnuts forwardly to the right, as seen in FIG. 2. As the doughnuts reach the flipper, the next forwardmost bar causes the flipper to invert the doughnuts. The bars continue to propel the doughnuts to the elevator belt 32 where they are raised out of the liquid and where they may drain excess liquid. Finally, the elevator belt deposits the doughnuts on a take-away ramp 74.

As is apparent from the foregoing, the machine is very easy to use, easy to assemble and disassemble, and inexpensive to manufacture. The technique by which the doughnuts are moved through the frying liquid without bunching greatly improves the operation of the machine. While the details of the machine and process have been described, it should be understood that variations will be apparent to one skilled in the art without departing from the principles herein. Accordingly, the invention is not to be limited to the specific embodiment illustrated herein.

We claim:

1. A process for moving small food objects through a hot liquid in a frying tank by a pusher bar conveyor having spaced pusher bars, comprising:
    heating the liquid in the tank to a frying temperature and creating liquid currents in the liquid;
    placing the objects into the liquid in front of the bars of the conveyor; and
    intermittently moving the bars at a generally constant speed through the liquid, for creating repetitive wave motions in the liquid to push the objects toward the next forward bar and overcoming the heat created liquid currents in the liquid thereby moving the objects in a straight path through the liquid to avoid misalignment.

2. The process of claim 1, said step of intermittently moving the bars including creating an eddy pulling current behind the next most forward bar to draw the objects forward toward the next most forward bar with each intermittent motion of the bars.

* * * * *